3,279,990
CARBOHYDRATE ESTERS OF SALICYLIC ACID, THEIR PRODUCTION AND ADMINISTRATION
William Brandt Rose and Leonard B. Spector, New York, N.Y., assignors of twenty percent to Albert L. Jacobs, Esq., New York, N.Y.
No Drawing. Filed Jan. 31, 1963, Ser. No. 255,168
20 Claims. (Cl. 167—65)

This invention relates to novel analgesic derivatives characterized by being water soluble, neutral and stable and more particularly to carbohydrate esters of salicylic acid which are useful as analgesics for salicylate thereapy and which can be put into new dosage forms.

Ordinary aspirin, which is acetylsalicylic acid is, well recognized as having poor water solubility and this fact has limited dosage forms and especially has prevented the preparation of relatively concentrated aqueous solutions of aspirin. Aspirin in the presence of moisture hydrolyzes into salicylic and acetic acids so that it is relatively unstable and has a rather strong acid reaction which has been found to be highly disadvantageous for many users in that it creates local hyper acidity, gastric irritation and upset and other adverse side effects. This is especially true where it is necessary to give rather large amounts of aspirin such as, for example, are required for the treatment of arthritis and rheumatic fever. So far as we are aware, these inherent disadvantages of aspirin have not been overcome by the various available formulations now on the market, some of which contain antacids or buffering components. Salicylamide has been placed in suspension in water by means of a suspending agent such as a cellulose derivative or a gum like gum acacia in order to provide a liquid product, but these have not been proved to be satisfactory partly because the suspensions are unstable and partly because it is not possible to make a highly potent product and even if such were done, it would increase the above-noted and other disadvantages is rather than ameliorate them. It has, in particular, not heretofore been possible to produce a true solution of aspirin or salicylamide which has a desired high potency. Inorganic salts of salicylic acid such as sodium salicylate are water soluble but unstable since they rapidly decompose in water. Simple esters such as the methyl ester are insoluble in water. In addition, salicylates such a sodium salicylate are undesirable and contraindicated for persons having hypertension or on a sodium-free diet. There thus remains a serious problem which has not been solved and it is to this problem that the present invention is directed.

Applicants have found that when salicylic acid is combined with a sugar or sugar-like substance, new compounds are formed which are very soluble in water, which are neutral and which are innocuous in the sense that they do not cause gastric irritation or upset. These new derivatives also make it possible to prepare new dosage forms such as relatively concentrated aqueous salicylate solutions which can, for example, be put up into ampules readily for intramuscular injection and in this latter way especially relatively large or high dosages can be given which do not have adverse effects. The new compounds or derivatives may be conveniently termed carbohydrate esters of salicylic acid and it has been particularly found that the salicylate esters of sorbitol are especially valuable.

The compounds have the formula:

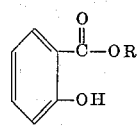

wherein R is selected from the group consisting of:
(a) Glucose, fructose or other triose, tetrose, pentose, hexose, heptose, or soluble derivative thereof;
(b) Sorbitol or other tetratol, pentatol, hexatol, heptatol, octatol, nonatol, decatol, dodecatol, or soluble derivative thereof;
(c) Sucrose or other disaacharide, trisaccharide, tetrasaccharide or pentasaccharide;
(d) Inositol or other soluble cylitol; and
(e) Ascorbic acid and its analogs.

The new esters may be monoesters or polyesters and, for example, with respect to sorbitol, there may be a plurality of salicylate radicals linked to the sorbitol molecule.

All derivatives responding to the above definition are herein termed carbohydrate esters of salicylic acid even though in certain species the compounds can be considered as mono- or polysalicylates of sorbitol and other carbohydrates.

The new esters can, in general, be prepared either by the reaction of salicyloyl chloride with the carbohydrate or by an ester interchange procedure between, for instance, methylsalicylate and sorbitol or by a combination of such procedures or by a variant procedure wherein, for example, silver salicylate is employed and in any of the foregoing processes a catalyst can be employed such as sodium hydroxide or potassium hydroxide.

The new esters are characterized by excellent analgesic activity and due to the nature of the new molecular configurations the analgesic activity is prolonged. It is also a characteristic of the new esters that when R is a radical or grouping having a sweet taste the finished product is extremely pleasant to take orally and, in addition, after hydrolysis in the physiological body fluids the split-off carbohydrate moiety has caloric or nutritive value which is readily assimilable. For products taken orally either in solid or solution form, the esters hydrolyze primarily in the alkaline fluids of the intestines and the salicylic acid or alicyl radical thus released is well and rapidly absorbed and tolerated and is free from the adverse side effects which are normal concomitants of orally ingested salicylates. The new esters are hence very unique and are particularly valuable for salicylate therapy. The esters are non-toxic and are soluble in water up to at least a 50 percent concentration or more. These high concentrations are valuable for parenteral preparations for intramuscular injection and while for this particular route of administration the question of gastric irritation and upset does not arise, the injectable salicylate solutions are free from irritation at the site of injection, do not cause appreciable lowering of the pH of the body fluids and rapidly disperse and become adsorbed so that they have excellent systemic effect.

Due to their chemical constitution, the new esters are unusually versatile not only as to the nature of the carbohydrate part of the molecule but as to the dosage form. Stable, neutral, aqueous solutions can be made having practically any desired salicylate concentration. For ampuling the concentration is of the order of 50 percent which may or may not be diluted at the time of actual use, depending upon circumstances, the particular therapy being followed and the judgment of the physician or technician, but mainly the concentration depends upon the particular pathological condition existing in a given patient and the severity of the condition. Stable, neutral, aqueous solutions containing a salicylate equivalent of a 2 percent to 10 percent concentration have been found to be preferred for most purposes. These solutions can be administered orally in liquid form or can be placed in ampules which are subsequently sealed for use as injectables, this being a dosage form not heretofore available at all for salicylate therapy. Since most of the esters are whitish solids they can be readily tabletted with the usual pharmaceutical excipients. Tablets can thus be made which are of any desired strength or potency such as 5 grains of salicylate equivalent or multiples or fractions thereof. Other therapeutic agents can, if desired, be combined with the salicylate esters. In those instances in which the salicylate ester is a viscous liquid, it can readily be dissolved in water. The new salicylate esters can also be in other unit dosage forms such as vaginal and rectal suppositories when combined with any of the usual suppository bases, of which Carbowax 6000 is preferred, since it is readily soluble in body fluids and quickly and completely releases the active therapeutic agents contained therein.

The invention is illustrated by the following non-limitative examples.

EXAMPLE I

6-salicyloyl glucose 1 part of 6-iodo-6-deoxy-3,5-benzylidene-1,2-isopropylidene-D-glucose (D. J. Bell, E. Friedmann and S. Williamson, J. Chem. Soc. 1937, 252), 0.73 part of silver salicylate and 39 parts of acetonitrile are refluxed for six hours, cooled and the precipitated silver salts removed by filtration. The filtrate is concentrated in vacuo at room temperature. The solid residue is 6-salicyloyl-6-deoxy-3,5-benzylidene-1,2-isopropylidene-D-glucose. The blocking groups are removed by refluxing for one hour a mixture of 1 part of the foregoing compound with 6 parts of methyl alcohol and 4 parts of 0.45 N $H_2SO_4$. To the cooled solution is added 1 part of barium carbonate and the mixture is concentrated nearly to dryness in vacuo at 30° C. to 40° C. To the residue is added 10 parts of water and the resulting mixture is filtered. The filtrate is then concentrated in vacuo at 30° C. to 40° C. The solid residue is 6-salicyloyl glucose.

EXAMPLE II

1-salicyloyl sorbitol

A mixture of 1 part of sorbitol, 0.85 part of salicyloyl chloride, 0.6 part of sodium carbonate and 1 part of water is shaken at room temperature until evolution of gas ceases. The solution is neutralized with normal hydrochloric acid and concentrated to dryness in vacuo. The solid residue is extracted with 5 parts of hot alcohol, filtered and cooled. 1-salicyloyl sorbitol separates on cooling.

EXAMPLE III

6-salicyloyl sucrose

A mixture of 1 part of salicyloyl chloride, 2 parts of sucrose and 10 parts of dry pyridine is allowed to stand at room temperature for two hours. The solvent is removed by distillation in vacuo, keeping the temperature below 50° C. The residue is dissolved in water and concentrated in vacuo to remove residual pyridine. The remaining solid is then boiled with 10 parts of alcohol, filtered and cooled. 6-salicyloyl sucrose crystallizes rapidly on standing.

EXAMPLE IV

Sorbityl salicylates

Four salicylate esters of sorbitol were prepared by ester interchange of methylsalicylate with sorbitol in the preferred and presently best-known mode of carrying out the invention and depending upon the reaction conditions and proportions of reactants, either a monoester or a polyester could be produced in yields ranging from 50 percent to 90 percent and all of which were water soluble to an extent at least many times that of aspirin which is normally soluble in water only to the extent of approximately .30 percent.

191.2 grams of sorbitol (one mole) and 50.7 grams of methylsalicylate (0.33 mole) were added to dimethylformamide and placed in a three-necked flask equipped with an immersion thermometer, a Vigreaux distillation column with a take-off head and condenser and the contents of the flask were heated under mechanical agitation to 85° C. The sorbitol was observed to go into solution. In order to eliminate moisture, about 50 milliliters of the 300 milliliters of dimethylformamide present were removed at about 100 millimeters of mercury. Then 1 gram of potassium hydroxide catalyst was added and the solvent was removed slowly over a period of six hours at a pressure of about 99 millimeters of mercury by gentle boiling, the boiling temperature being in the range of 40° C. to 55° C. The temperature was then raised to 85° C. to 90° C. at which time the reaction was stopped and any residual dimethylformamide removed at a pressure of 3 millimeters of mercury by vacuum distillation while preventing the temperature during distillation from exceeding 70° C.

While still hot and fluid the reaction mixture was poured under rapid stirring into hot acetone and after a temperature was obtained at which the acetone started to boil, the stirring was stopped and the hot acetone poured into a distillation flask and removed at a slight subatmosphereic pressure and then gradually reducing the pressure to 3 millimeters of mercury and a temperature below 60° C. until all acetone was eliminated.

The resulting product was washed three times with hot cyclohexane which was decanted while still hot after each washing and the cyclohexane washings were followed by three washings with hot benzene. A product of melting point 117° C. to 120° C. separated from the benzene on cooling and was found to be the diester.

The product remaining after the benzene washes was dried by heating at a temperaure of 85° C. to 90° C. for eight hours at a pressure of 1 millimeter of mercury thereby producing a product which was a brittle amorphous solid at 0° C. and a viscous water-soluable liquid at ambient temperature. This product was diluted with whereupon a white solid separated and additional water was added until no further cloudiness or turbidity occurred whereupon the solution was cooled and the solid was filtered off. This acetone soluable ester had a melting point of 135° C.

It was possible also to isolate two other esters from the reaction. One had a melting point of 68° C. to 72° C. and separated from the acetone used to wash the recovered sorbitol. The other product had a melting point of 107° C. to 110° C. and was obtained by evaporaing the acetone remaining after the recovery of the product of melting point 68° C. to 72° C. Both products were water soluable.

The above four esters upon hydrolysis with potassium hydroxide and reacidification with hydrochloric acid yielded salicylic acid of melting point 153° C.

EXAMPLE V

Sorbitol and salicylic acid were reacted in cyclohexane in the presence of p-toluenesulfonic acid as catalyst. During the reaction water of condensation was formed and a compound melting at 163° C. to 165° C. was isolated from the reaction mixture. The same compound melting at the same temperature was obtained after separation procedure in the ester interchange reaction carried out between methylsalicylate and sorbitol using potassium hydroxide as catalyst. The compound is polyesterified sorbitol, i.e. it is sorbitol with more than one salicylate ester group. The ester interchange reaction between the polyesterified material and an excess of sorbitol proceeds as follows:

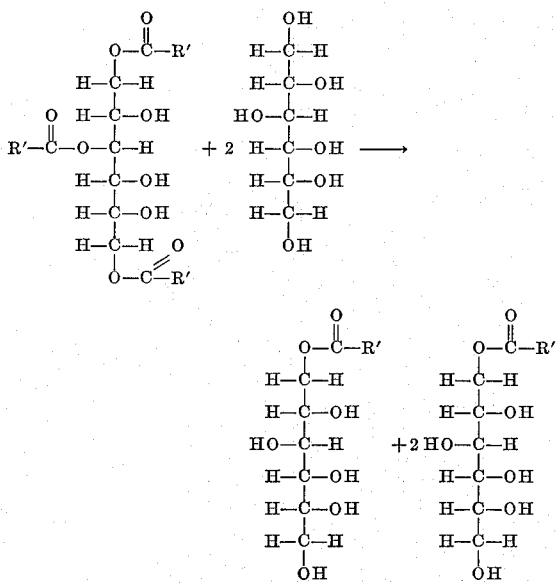

wherein R' is the salicyl (OH·C₆H₄-) radial.

Instead of p-toluenesulfonic acid, sulfuric acid can be substituted as the catalyst for the reaction between salicylic acid and sorbitol.

The present invention includes the new esters as novel chemical compounds, various compositions and dosage forms of those esters, procedure for making the esters and the method of administering them in their final dosage forms for salicylate therapy. In this way, salicylate therapy can be importantly extended into new and hitherto unknown products and dosage forms. For the first time, salicylates can be placed in parenteral or injectable form without the use of any organic solvent or suspending agent. In the esters according to the invention, R wherever referred to is always a pharmaceutically acceptable nontoxic group of sugar or sugar-like nature and may be any of the carbahydrates coming within the definition of R so long as the molecule as a whole is water soluable, neutral and stable. It will be understood that some of the new esters are more soluable than others but all of them are much more soluable than aspirin by at least two to three times and usually at least about five to ten times as soluable. When the esters are ingested they hydrolyze in body fluids and the released salicylic acid or salicyl radical absorbed under highly favorable conditions wherein the split-off ester group acts as a buffer, as a nutrient or to prolong the therapeutic action while at the same time avoiding local tissue irritation. The new esters are hence unique forms of salicylates.

EXAMPLE VI

Glucose salicylate

Salicyloyl chloride and glucose were reacted in the general manner described above to form compounds in which the esters of glucose with salicylic acid were chlorinated. The chlorinated products are then dechlorinated by any procedure per se known. In this same way also the fructose ester of salicylic acid was prepared.

What is claimed is:
1. A water-soluble carbohydrate ester derivative of salicylic acid.
2. A water-soluble salicylate ester of sorbitol.
3. A water-soluble carbohydrate ester of salicylic acid compound of the formula:

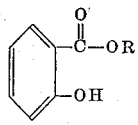

in which R is selected from the group consisting of glucose, fructose, sucrose, sorbitol, inositol and ascorbic acid.
4. 6-salicyloyl glucose.
5. 1-salicyloyl sorbitol.
6. 6-salicyloyl sucrose.
7. A stable aqueous injectable solution of a carbohydrate ester of salicylic acid suitable for analgesic therapy in which the concentration of the ester in the solution is at least about 2 percent and in the range of 2 percent to 50 percent.
8. A sealed ampule containing a unit dose of a stable aqueous solution of claim 7.
9. A pharmaceutical composition useful for salicylate therapy which consists essentially of a therapeutically effective amount of a carbohydrate ester of salicylic acid combined with a pharmaceutical carrier, the ester being in solid form and soluble in water.
10. A suppository for salicylate therapy which consists essentially of a water-soluble suppository base containing a therapeutically effective amount of a water-soluble carbohydrate ester of salicylic acid.
11. A process for the preparation of a water-soluble carbohydrate ester of salicylic acid which comprises reacting a pharmaceutically acceptable non-toxic carbohydrate with salicyloyl chloride and recovering the ester thus produced.
12. A process for the preparation of a water-soluble carbohydrate ester of salicylic acid which comprises reacting a pharmaceutically acceptable non-toxic carbohydrate with salicyloyl chloride and recovering the ester thus produced, the reaction being carried out in the presence of potassium hydroxide as catalyst.
13. A process for the preparation of a water-soluble carbohydrate ester of salicylic acid which comprises reacting a pharmaceutically acceptable non-toxic carbohydrate with methylsalicylate in a non-aqueous solvent and in the presence of potassium hydroxide as catalyst and recovering the ester thus produced.
14. A process in accordance with claim 13 in which the carbohydrate is sorbitol.
15. A process for the preparation of a water-soluble sorbityl salicylate which comprises reacting sorbitol and salicylic acid in an organic solvent and in the presence of KOH or NaOH as catalyst and recovering the sorbityl ester thus produced.
16. A method of effecting analgesia which comprises administering an analgesically effective amount of a water-soluble carbohydrate ester of salicylic acid sufficient to overcome pain.
17. A method of effecting analgesia which comprises administering an analgesically effective amount of sorbityl salicylate.
18. A method effecting analgesia which comprises administering an analgestically effective amount of 1-salicyloyl sorbitol.
19. A method according to claim 16 in which the ester is in solid form.

20. A method according to claim 16 in which the ester is dissolved in water and administered as an aqueous solution.

References Cited by the Examiner
UNITED STATES PATENTS

| | | | |
|---|---|---|---|
| 2,086,386 | 6/1937 | Merrill | 167—65 |
| 2,687,366 | 8/1954 | Seifter | 167—65 |
| 2,787,620 | 4/1957 | Mast | 260—474 |
| 2,904,469 | 9/1959 | Nahed | 167—65 |
| 2,918,491 | 12/1959 | Radue | 260—474 |
| 3,012,064 | 12/1961 | Hertling et al. | 260—474 |
| 3,039,927 | 6/1962 | Lafon | 167—65 |
| 3,074,850 | 1/1963 | Hasspacker | 167—65 |

LEWIS GOTTS, *Primary Examiner.*

JULIAN S. LEVITT, *Examiner.*

EUGENE FRANK, JOHNNIE R. BROWN,
*Assistant Examiners.*